June 4, 1946.  R. M. FAUBION  2,401,470
FRUIT JAR HOLDER
Filed Dec. 2, 1943  2 Sheets-Sheet 1
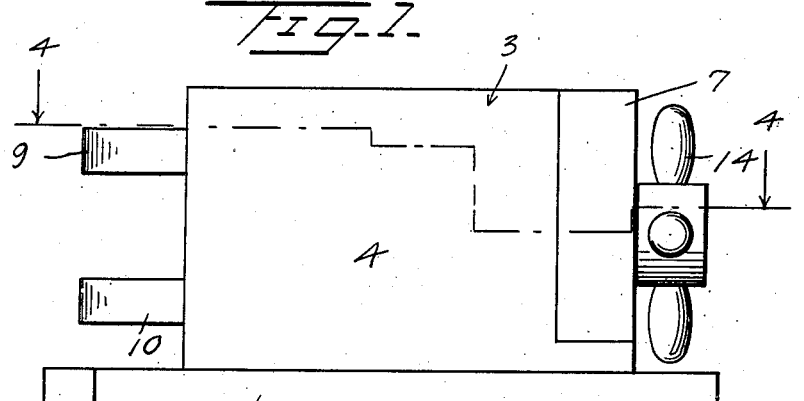
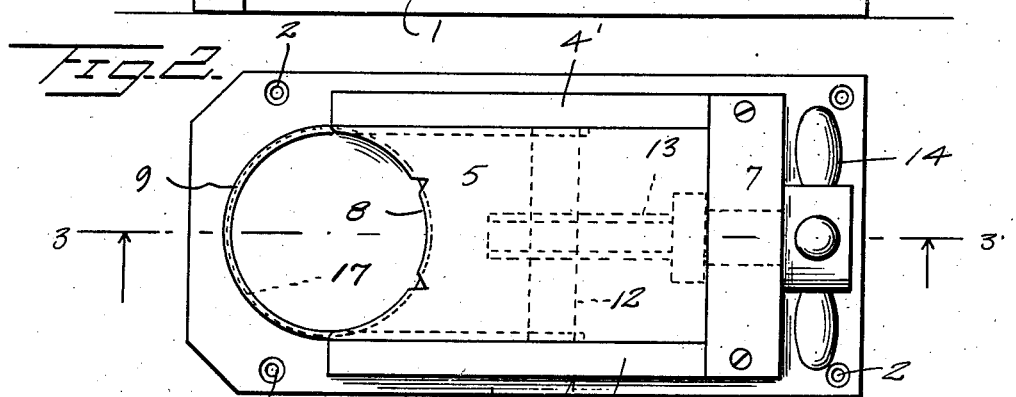
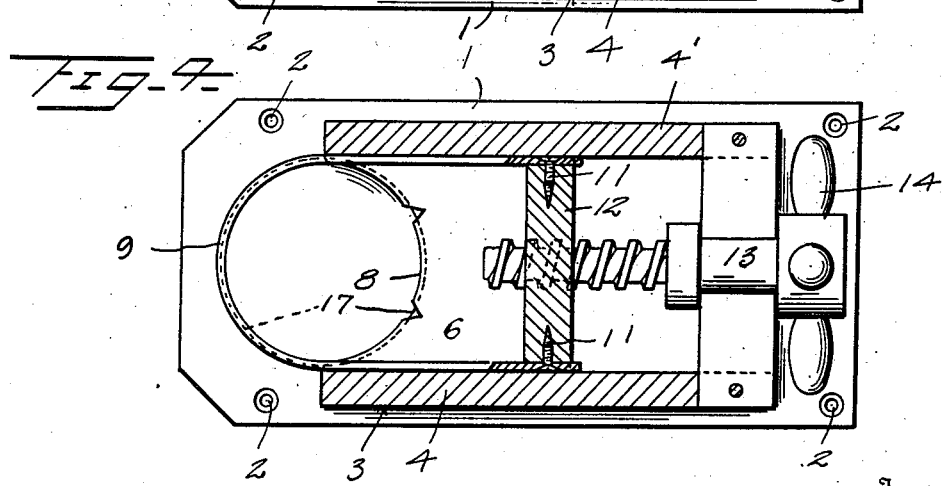
Inventor
R. M. Faubion Inventor
R. M. Faubion
By [signature]
Attorney Patented June 4, 1946

2,401,470

UNITED STATES PATENT OFFICE 2,401,470

FRUIT JAR HOLDER

Roy M. Faubion, El Reno, Okla.

Application December 2, 1943, Serial No. 512,665

1 Claim. (Cl. 81—3.32)

This invention relates to new and useful improvements in fruit jar holders.

The primary object of my invention is to provide a device of the character specified adapted to securely hold a fruit jar while the lid is screwed on or off, thus leaving both hands free to perform the above operation and obviating the necessity of grasping the jar, usually hot, with a tea towel or other cloth, in one hand.

A further object of my invention is to provide a fruit jar holder, which is simple and economical in construction and highly efficient and durable in use.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which is for illustrative purposes only and is therefore not drawn to scale:

Figure 1 is a perspective view of a fruit jar holder, constructed in accordance with my invention.

Figure 2 is a plan view.

Figure 4 is a vertical transverse section, taken on line 4—4 of Figure 1.

Figure 3:
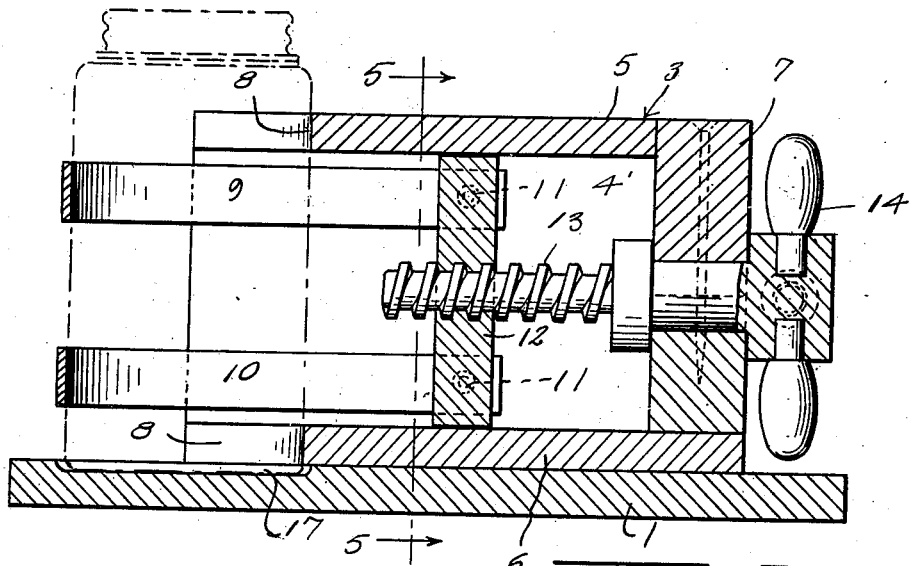
Figure 3 is a central longitudinal section, taken on line 3—3 of Figure 2.
Figure 5:
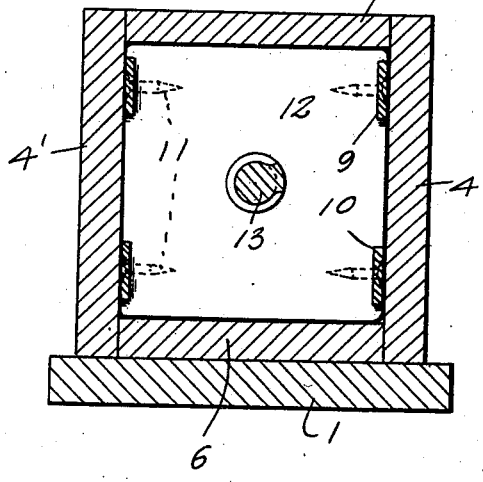
Figure 5 is a vertical transverse section, taken on line 5—5 of Figure 3.

Referring to the drawings for a more particular description of my invention and in which drawings like parts are designated by like reference characters throughout the several views, the numeral 1 represents a rectangular oblong wooden base, which is bolted or otherwise fastened at its corners, as at 2, to the kitchen table or other suitable support.

A rectangular oblong frame or casing 3, consisting of the side members 4 and 4', top and bottom members 5 and 6 respectively, and the rear end member 7, is mounted on the base 1, and in carrying out my invention, the front end of the casing is left open and the corresponding ends of the top and bottom members 5 and 6 formed with arcuate recesses 8 to receive the body portion of the fruit jar.

Upper and lower flexible strips or bands 9 and 10, of cotton, leather or other suitable material, co-act with the front recessed ends 8 of the top and bottom members 5 and 6, in holding the fruit jar A against turning while the lid is being screwed on or off. As shown, the ends of said strips or bands are fastened, as at 11, to the side edges of the wooden block 12, mounted for longitudinal movement in the casing 3. The block 12 is adjusted by means of the longitudinal screw 13, provided at its outer end with a suitable handle 14.

In practice, the jar is clamped between the recessed front ends 8 of the top and bottom members 5 and 6 and the loops 15 and 16 of the flexible bands 9 and 10, by means of the screw 13, and when the jar is held sufficiently tight, the lid may be screwed on or off, without any possibility of the jar turning. The use of my fruit jar holder leaves both hands free to accomplish this operation and obviates the necessity of grasping a jar, usually hot, with a tea towel or cloth in one hand.

The base 1 may be provided in its upper face, adjacent its front end, with a recess 17 to set the jar in place.

While my invention is primarily designed for holding fruit jars, it may also be used to advantage in holding other jars or bottles, regardless of the shape, in screwing on or off the top.

From the foregoing description taken in connection with the drawings, it is thought that the construction, operation and advantages of my invention will be readily understood, without requiring a more extended explanation.

Various changes in the form, proportions and minor details of construction may be resorted to without departing from the principles or sacrificing any of the advantages of my invention, as defined in the appended claim.

Having described my invention, what I claim as new and desire to secure by Letters Patent is:

A fruit jar holder comprising a base, a casing mounted on the base, said casing comprising side and end members and top and bottom members, the top and bottom members formed in their front ends with arcuate recesses to fit the contour of the jar, flexible bands co-acting with the front recessed ends of said top and bottom members in clamping the jar tightly in place against turning while the lid is screwed on or off, a block slidably mounted in the casing and having fastened thereto the ends of said flexible bands for adjusting the latter in jar clamping or releasing position, and a screw for actuating said block.

ROY M. FAUBION.